(12) United States Patent
Womack et al.

(10) Patent No.: US 8,437,595 B2
(45) Date of Patent: May 7, 2013

(54) FIBER MANAGEMENT SHELF HAVING REMOVABLE DOOR

(75) Inventors: Wade James Womack, Allen, TX (US); Gil Ruiz, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 509 days.

(21) Appl. No.: 12/707,385

(22) Filed: Feb. 17, 2010

(65) Prior Publication Data

US 2010/0207498 A1   Aug. 19, 2010

Related U.S. Application Data

(60) Provisional application No. 61/153,613, filed on Feb. 18, 2009, provisional application No. 61/153,617, filed on Feb. 18, 2009.

(51) Int. Cl.
*G02B 6/00* (2006.01)
(52) U.S. Cl.
USPC ............................................. 385/135
(58) Field of Classification Search ............ 385/135
See application file for complete search history.

(56) References Cited

U.S. PATENT DOCUMENTS

| 4,655,489 A | 4/1987 | Bisbing |
| 5,689,605 A | 11/1997 | Cobb |
| 5,765,263 A * | 6/1998 | Bolinas et al. .............. 16/342 |
| 6,427,045 B1 * | 7/2002 | Matthes et al. ............ 385/135 |
| 2004/0099773 A1 | 5/2004 | Sono |
| 2004/0240827 A1 | 12/2004 | Daoud |
| 2007/0274645 A1 | 11/2007 | Murano |

\* cited by examiner

*Primary Examiner* — Uyen Chau N Le
*Assistant Examiner* — Hoang Tran
(74) *Attorney, Agent, or Firm* — Muncy, Geissler, Olds & Lowe, PLLC

(57) ABSTRACT

A fiber management shelf includes a housing having an opening, a door shiftable between open and closed positions, and a hinge connecting the door to the housing. The hinge includes a hinge pin and a receiver configured to receive and rotatably support the hinge pin. The receiver includes a channel having first and second sides defining a channel opening having a first channel width and at least one boss on the first or second channel side so that the channel has a second width at the boss less than the first channel width. The hinge pin has a first portion with a first width in a first direction and a second width in a second direction less than the first hinge pin width, and the first hinge pin width is greater than the second channel width and the second hinge pin width is less than the second channel width.

18 Claims, 4 Drawing Sheets

FIBER MANAGEMENT SHELF HAVING REMOVABLE DOOR

CROSS-REFERENCE TO RELATED APPLICATIONS

The present application claims the benefit of U.S. Provisional Patent Applications No. 61/153,613, filed Feb. 18, 2009, and 61/153,617, filed Feb. 18, 2009, the entire contents of which are hereby incorporated by reference.

FIELD OF THE INVENTION

The present invention is directed to a fiber management shelf having a removable door and, more specifically, toward a fiber management shelf having a door pivotable between first and second positions that is removable from the fiber management shelf in an intermediate position between the first and second positions.

BACKGROUND OF THE INVENTION

Data centers that support one or more businesses, factories or residential areas typically comprise one or more racks or cabinets filled with interconnection sites for optical fibers and fiber optic cables. In a typical installation, fiber optic cables that include multiple optical fibers from an external source (these are often known as "outside plant" or "OSP" fibers) enter the cabinet and are spliced together with individual optical fibers known as "pigtails." Splicing typically occurs in a splice tray or similar component that includes multiple splice sites. The pigtail fibers are then connected within the cabinet to standard termination sites. The termination sites include termination ports that connect optically with "jumper" optical fibers that exit the rack or cabinet to supply data or other information in optical form to the remainder of the building or site. The termination sites can be provided in a number of forms, including fiber distribution cartridges, fiber distribution modules, multi-position adapter couplers and/or bezels.

Fiber management shelves are often provided a front door for providing selective access to the termination sites and elements near the front of the shelf and/or a rear door providing selective access to the splice panel and elements at the rear of the shelf. These doors may be easily opened and closed as needed. However, for some actions, including installing or removing termination sites or working on the splice panel, it may be useful to completely remove the front or rear door. Sometimes removal is required to add or remove elements from the splice panel; sometimes door removal merely makes it faster or easier to work on the interior of the splice panel. In either case, it may be necessary to remove screws and/or hinge assemblies, which may be spring biased and include multiple parts, from the shelf. It would be desirable to provide a fiber management shelf with a door that can be removed and reattached without tools which door still performs the functions of conventional doors on fiber management panels.

SUMMARY OF THE INVENTION

These problems and others are addressed by the present invention, a first aspect of which comprises a fiber management shelf having a housing with an opening, a door pivotably mounted on the housing and shiftable from a first position substantially covering the opening to a second position allowing access to the opening past an intermediate position between the first position and the second position, and a hinge connecting the door to the housing. The hinge includes at least one hinge pin that is located on one of the housing and the door and at least one receiver configured to receive and rotatably support the at least one hinge pin that is located on the other one of the housing and the door. The receiver comprises a channel having a length and first and second sides defining a channel opening having a first channel width and at least one boss on the first or second channel side, and the channel has a second channel width at the boss less than the first channel width. The hinge pin has a length and a first portion having a first hinge pin width in a first direction and a second hinge pin width in a second direction less than the first hinge pin width, and the first hinge pin width is greater than the second channel width and the second hinge pin width is less than the second channel width.

Another aspect of the invention comprises a fiber management shelf that includes a housing having an opening, a door pivotably mounted on the housing and shiftable from a first position substantially covering the opening to a second position allowing access to the opening past an intermediate position between the first position and the second position, and a hinge mechanism for pivotably supporting the door on the housing for motion from the first position to the second position, the hinge mechanism preventing the door from being removed from the housing except when the door is in the intermediate position.

A further aspect of the invention comprises a method of using a fiber management shelf as described above that includes pivoting the door from the first position to the intermediate position and removing the door from the housing by pulling the at least one hinge pin through the channel opening and past said at least one boss.

BRIEF DESCRIPTION OF THE DRAWINGS

These and other aspects of the invention will be better understood after a reading of the following detailed description together with the attached drawings, wherein.

DETAILED DESCRIPTION

Figure 1:
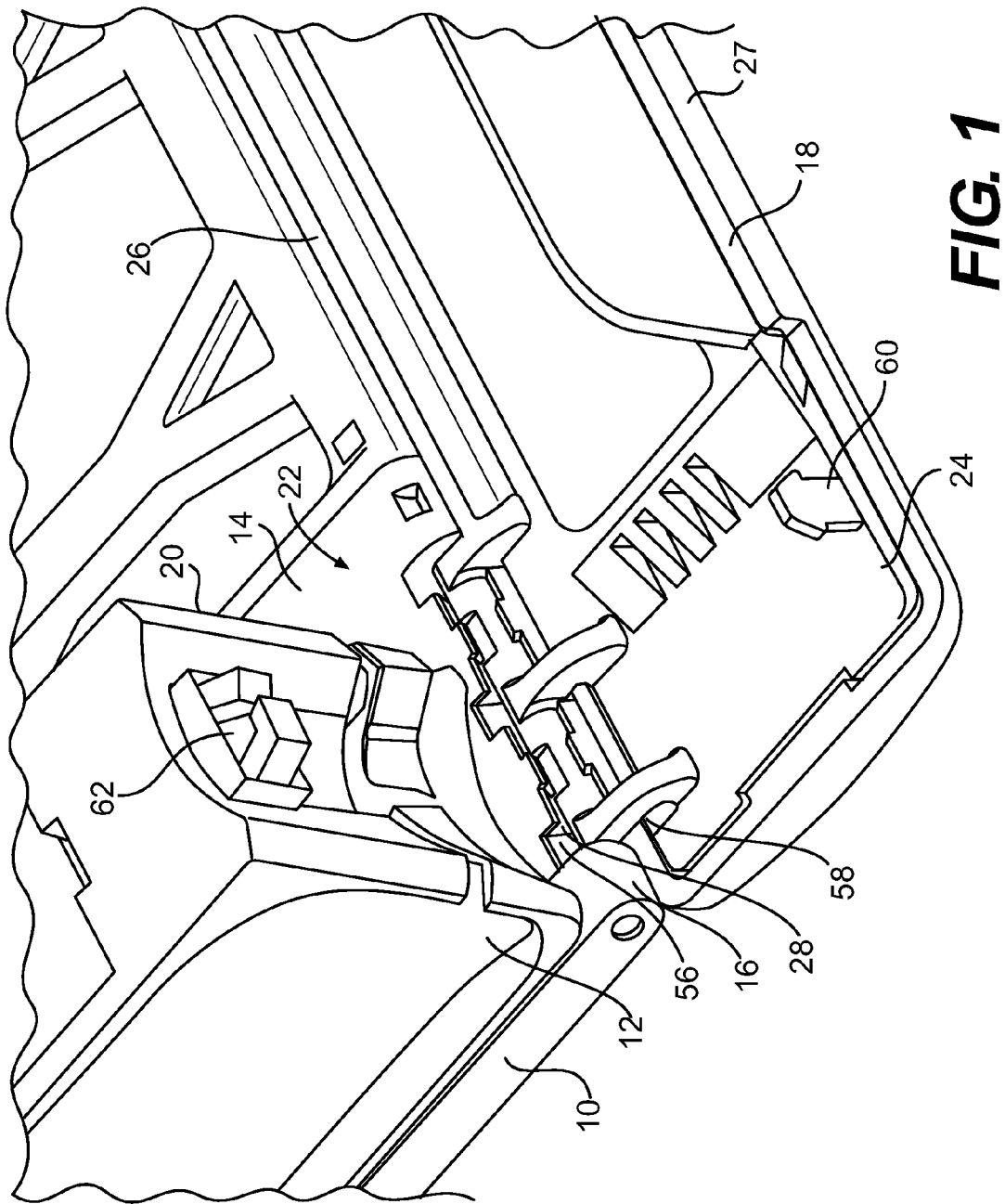
FIG. 1 is a perspective view of a housing and a removable door of a fiber management shelf according to an embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
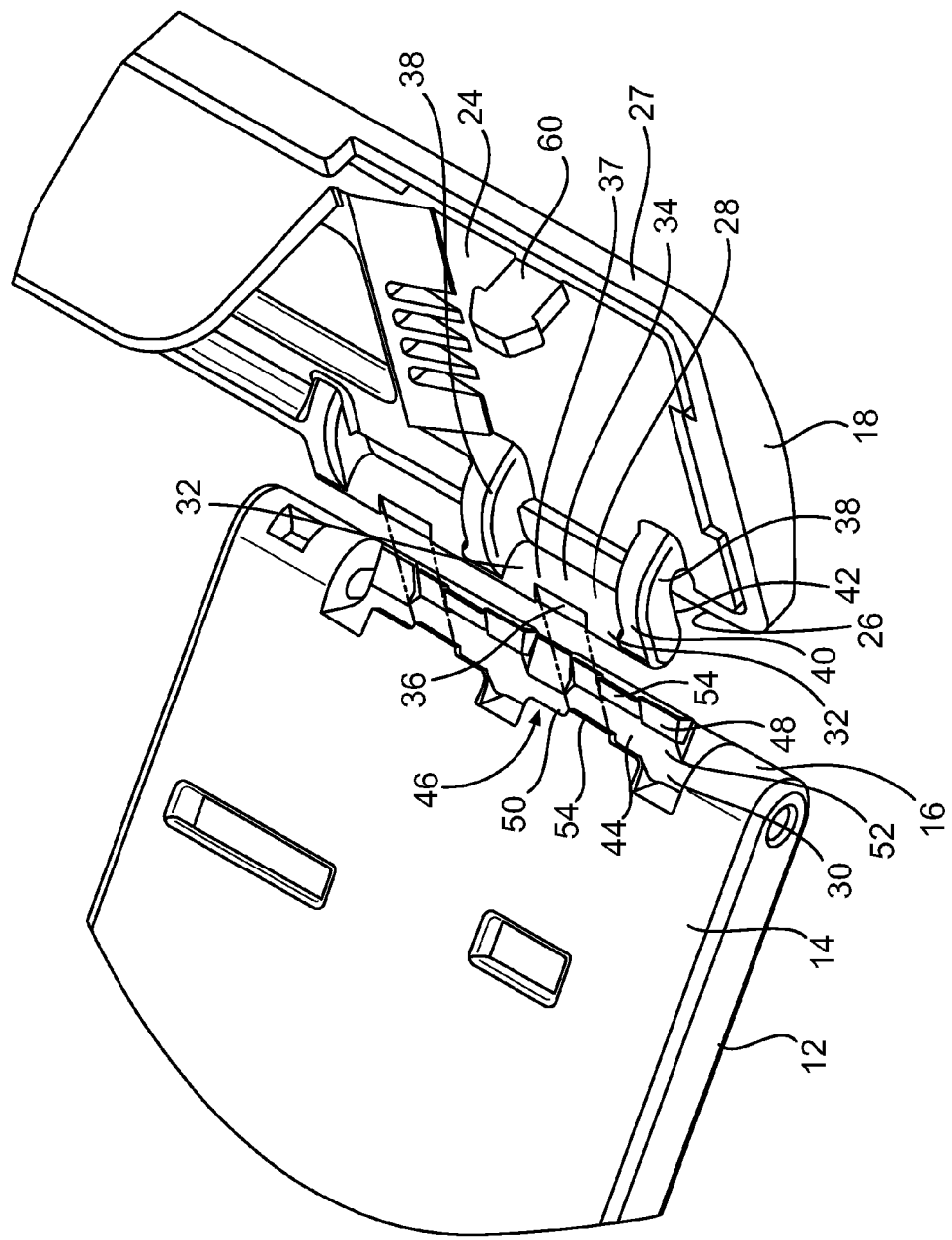
FIG. 2 is a perspective view of the housing and door of FIG. 1 with the door detached from the housing.

FIGS. 1 and 2 illustrate a fiber management shelf 10 that includes a housing 12 having a floor 14 with a radiused edge 16 and a door 18 attached to the housing 12 near edge 16 for selectively allowing access to opening 20 in the housing. As used herein, "housing" refers to the elements surrounding a plurality of fiber optic components and may comprise the floor of a fiber optic management shelf, the side walls of the fiber optic management shelf or a rack (not illustrated) in which the shelf is mounted, and/or a top wall that may be formed by another element mounted above the fiber optic management shelf in a rack. The housing may also be defined at least in part by one or more fiber retainer rings mounted near either side of the door at the front of a fiber management shelf. Door 18 is removably attached to housing 12 by a hinge, indicated generally by reference numeral 22, and includes an inner surface 24 that will face opening 20 when door 18 is in a closed position, a proximal edge 26 that remains close to radiused edge 16 of floor 14 and a distal edge 27 that moves toward and away from housing 12 when door 18 pivots between open and closed positions as described herein. Two hinges 22 are illustrated in FIG. 1 at the left side of a door, and a second pair of hinges (not illustrated) is present on the right side of the door. The hinges 22 are substantially identical, and only one hinge 22 is described below.

Hinge 22 comprises a hinge pin 28 on door 18 and a receiver 30 on housing 12. Hinge pin 28 includes first and second generally cylindrical ends 32 and a central portion 34 with first and second flattened, parallel portions 36 which are spaced apart from each other a distance less than the diameter of the cylindrical ends 32 of hinge pin 28. First and second arcuate portions 37 connect the flattened portions 36 and generally conform to the curvature of the cylindrical ends 32. The distance between the first and second arcuate portions 37 is the same as the diameter of the first and second cylindrical ends 32; the distance between the flattened portions 36 is less than the diameter of the first and second cylindrical ends 32. First and second arms 38 connect to first and second ends 32 of hinge pin 28 to support hinge pin 28 in a spaced relation above inner surface 24 of door 18 and extending at least partially beyond the plane of the proximal edge 26 of door 18. The first and second arms 38 include a first surface 40 that faces toward door inner surface 24 and a second surface 42 that faces away from door inner surface 24, and both first surface 40 and second surface 42 are generally parallel to inner surface 24 of door 18.

Receiver 30 comprises a channel 44 having an opening 46 with spaced apart, generally parallel side walls 48 having upper edge 50. The distance between side walls 48 at upper edge 50 is greater than the diameter of hinge pin 28, while the interior of the channel is configured to substantially conform to the shape of the cylindrical ends 32 of the hinge pin 28 to form a bearing surface 52 for cylindrical ends 32 and arcuate portions 37 when the door 18 moves between open and closed positions. A first boss 54 projects from a first one of the channel side walls 48 and a second boss 54 projects from the opposite channel side wall 48 across from the first boss 54. The first and second bosses 54 constrict the channel opening 46 and constitute a narrowed portion of channel opening 46. The distance between first and second bosses 54 is greater than the distance between the first and second parallel portions 36 of hinge pin 28 but less than the distance between the first and second arcuate portions 37 and the diameter of cylindrical end portions 32 of hinge pin 28. Channel 44 includes a first slot 56 at one end of channel 44 that extends into floor 14 of housing 12 and a second slot 58 across the channel 44 from first slot 56 in the radiused edge 16 of housing 12.

Figure 3:
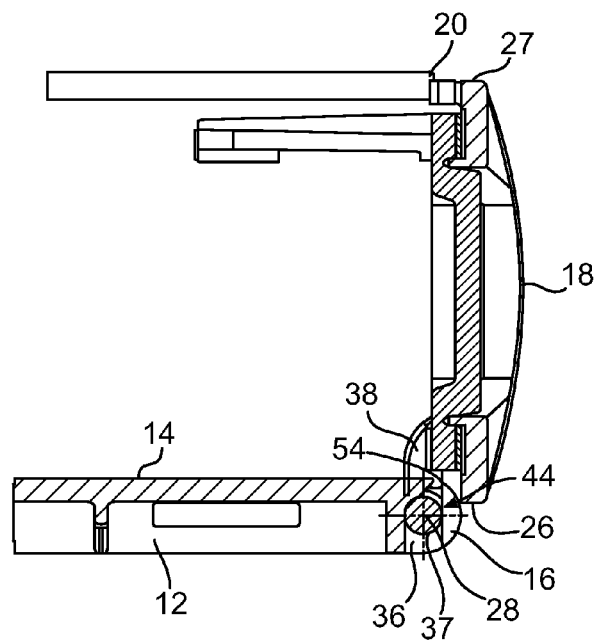
FIG. 3 is a sectional side elevational view of the door and housing of FIG. 1 with the door in a closed position.
Figure 4:
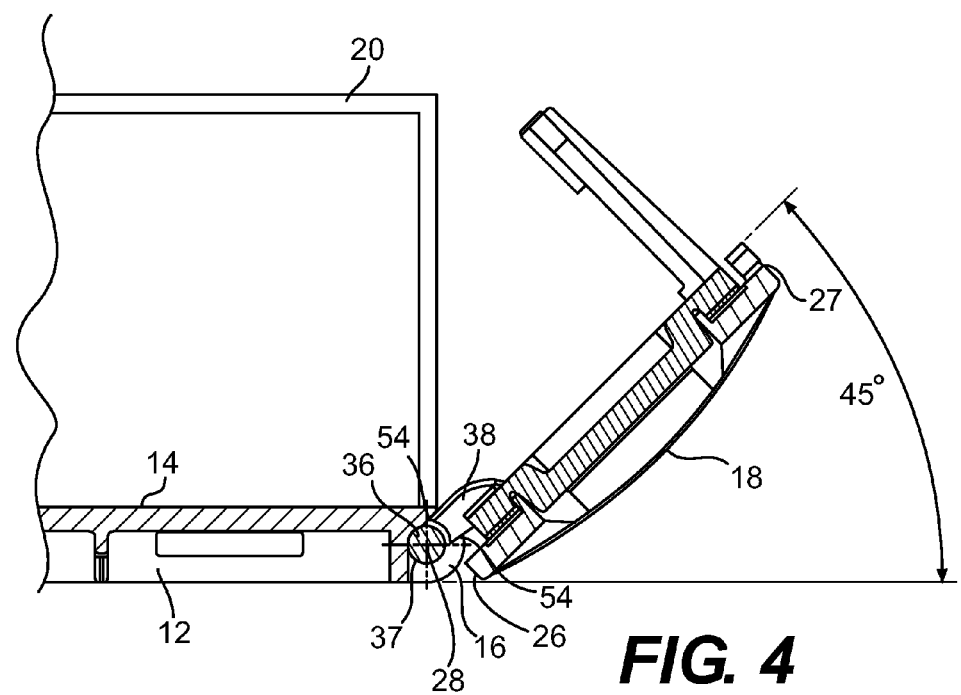
FIG. 4 is a sectional side elevational view of the door and housing of FIG. 1 with the door in a partially open, intermediate, position.
Figure 5:
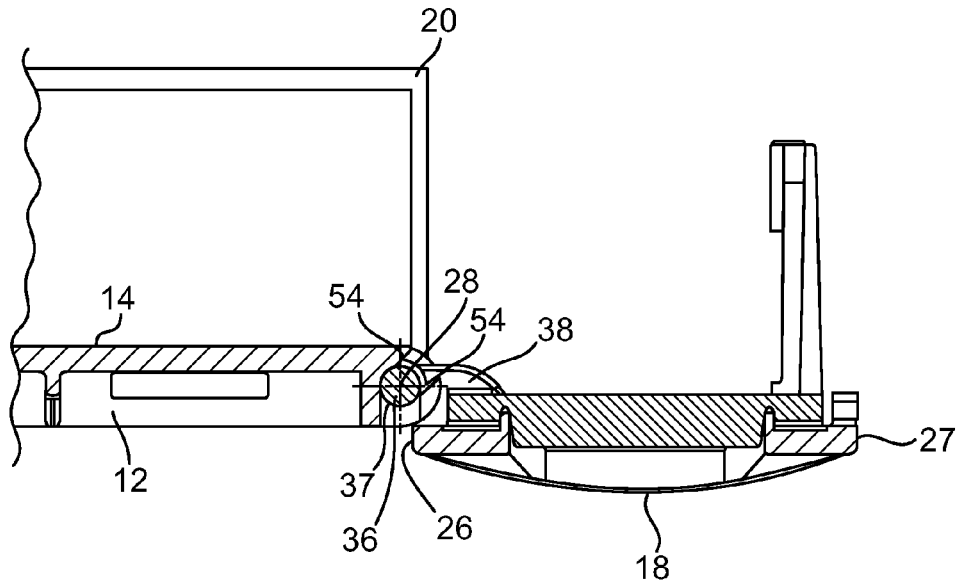
FIG. 5 is a sectional side elevational view of the door and housing of FIG. 1 with the door in an open position.

Referring now to FIG. 2, door 18 is attached to housing 12 by aligning the first and second flattened portions 36 of hinge pin 28 with the space between the first and second bosses 54 and inserting hinge pin 28 into channel 44 until the cylindrical end portions 32 and one of the arcuate portions 37 contact bearing surface 52. The bosses 54 of receiver 30 and first and second parallel portions 36 on the hinge pin 28 are configured such that the central portion 34 of the hinge pin 28 can pass between the bosses 54 when the door 18 makes an angle of about 135 degrees with the floor 14 of the housing 12 or is opened about 45 degrees as viewed from the outside of the housing. Changes to the configuration of the bosses and/or the flattened portions 36 of the hinge pin 28 could be made to make the door 18 removable and insertable at a different angle to the housing floor. However, it is generally preferable to make the door removable in an intermediate position between the opened and closed positions so that the door will be securely retained in the receiver 30 when in the open or closed positions, the positions in which the door is usually found. With the cylindrical end portions 32 and arcuate portions 37 of hinge pin 28 in contact with bearing surface 52, door 18 can be moved from the insertion/removal position illustrated in FIG. 4 to either the closed position covering opening 20, as illustrated in FIG. 3, or the open position, as illustrated in FIG. 5. Except when door 18 is in the intermediate position illustrated in FIG. 4, it is securely retained by bosses 54 and channel 44 and cannot be removed from channel 44.

Door 18 is moved from the insertion position toward the closed position illustrated in FIG. 3 by moving distal edge 27 of door 18 toward housing 12 until a first latch element 60 on door 18 engages a complementary second latch element 62 on housing 12 to hold door 18 in the first, closed position. First latch element 60 and second latch element 62 are preferably two halves of a push-push type latch that secures the door 18 to the housing 12 when first latch element 60 is pressed into second latch element 62 and that releases door 18 when door 18 is again pressed toward second latch element 62. When door 18 is pressed toward housing 12, the first latch element 60 is released from second latch element 62, and distal end 27 of door 18 can pivot away from the housing 12 toward the open position illustrated in FIG. 5. Door 18 moves past the intermediate insertion/removal position illustrated in FIG. 4 during this travel; however, because the forces applied against door 18 during this movement are primarily downward, door 18 does not exit receiver 30 unless a user applies an outward and upward force on door 18 when it is in the intermediate position of FIG. 4. As door 18 reaches the second position, second surface 42 of arm 38 enters second slot 58 in radiused edge 16 of floor 14, and the second slot 58 forms a stop for the arm 38 and hence the door 18 and limits the opening of the door to approximately 95 degrees.

Figure 6:
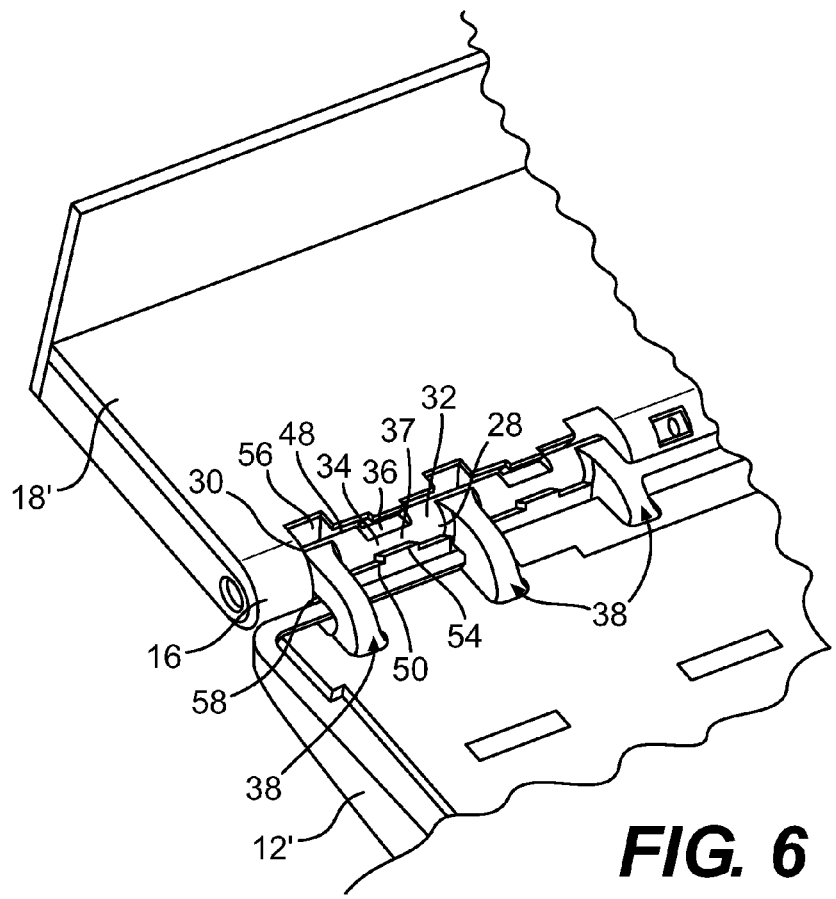
FIG. 6 is a perspective view of a housing and a removable door of a fiber management shelf according to another embodiment of the invention.

The hinge pin 28 and the receiver 30 have been described as being formed on the door 18 and housing 12, respectively. However, in a second embodiment of the invention illustrated in FIG. 6, the hinge pin 28 is formed on a housing 12' and the receiver 30 is formed on the door 18'. This embodiment otherwise is constructed and functions in the same manner as the embodiment described above, and the same reference numerals are used to identify elements common to both embodiments.

The present invention has been described herein in terms of presently preferred embodiments. However, additions and modifications to these embodiments will become apparent to those of ordinary skill in the relevant arts upon a reading of the foregoing description. It is intended that all such additions and modifications form a part of the present invention to the extent they fall within the scope of the several claims appended hereto.

What is claimed is:

1. A fiber management shelf comprising:
a housing having an opening;
a door pivotably mounted on the housing and moveable from a first position substantially covering said opening to a second position allowing access to said opening past an intermediate position between said first position and said second position; and
a hinge connecting said door to said housing and comprising at least one hinge pin located on a first one of said housing and said door and at least one receiver configured to receive and rotatably support said at least one hinge pin located on a second one of said housing and said door,
said at least one receiver comprising a channel having a length and first and second channel sides defining a channel opening having a first channel width, and at least one boss on said first or second channel side, the channel having a second channel width at said at least one boss less than said first channel width;
said at least one hinge pin having a length and a first portion having a first hinge pin width in a first direction and a second hinge pin width in a second direction less than said first hinge pin width, said first hinge pin width being greater than said second channel width and said second hinge pin width being less than said second channel width.

2. The fiber management shelf of claim 1, wherein said door is removable from said housing when said door is in said intermediate position.

3. The fiber management shelf of claim 1, wherein said at least one hinge pin first portion includes first and second planar portions separated by said second width and when said door is in said intermediate position, said first planar portion faces is aligned with said at least one boss.

4. The fiber management shelf of claim 1, wherein said at least one hinge pin first portion includes first and second planar portions separated by said second width.

5. The fiber management shelf of claim 4 wherein said at least one hinge pin first portion includes first and second arcuate portions connecting said first and second planar portions.

6. The fiber management shelf of claim 1 wherein intermediate position is approximately half way between said first position and said second position.

7. The fiber management shelf of claim 1 wherein said at least one hinge pin comprises a plurality of hinge pins and said at least one receiver comprises a plurality of receivers.

8. The fiber management shelf of claim 1 including a bottom wall lying in a first plane, wherein when said door is in said intermediate position, the line perpendicular to said second direction meets said plane at an angle of about 45 degrees.

9. The fiber management shelf of 1, wherein said receiver is located on said housing.

10. The fiber management shelf of claim 1 wherein said hinge pin is located on said housing.

11. The fiber management shelf of claim 1 including an optical fiber termination module or a fiber optic splice tray mounted in said opening.

12. The fiber management shelf of claim 1 wherein said hinge includes at least one arm supporting said hinge pin in a spaced relationship with said first one of said housing and said door.

13. The fiber management shelf of claim 12, wherein said second one of said housing and said door comprises at least one first slot aligned with said at least one arm, said at least one first slot configured to receive said at least one arm when said door is in said first position.

14. The fiber management shelf of claim 13, wherein said second one of said housing and said door comprises at least one second slot, said at least one second slot including a wall forming a stop, said arm contacting said wall of said at least one second slot when said door is in said second position.

15. The fiber management shelf of claim 12, wherein said at least one arm comprises first and second arms on first and second ends of said hinge pin, said first portion lying between said first and second arms.

16. A method comprising:
   providing a fiber management shelf according to claim 1;
   pivoting the door from the first position to the intermediate position; and
   removing the door from the housing by pulling the at least one hinge pin through the channel opening and past said at least one boss.

17. The fiber management shelf of claim 1, wherein the hinge pin is integrally formed on a first one of said housing and said door.

18. The fiber management shelf of claim 1, wherein the hinge pin is fixed relative to said housing or relative to said door.

* * * * *